United States Patent
Klebanov et al.

(10) Patent No.: US 8,024,767 B1
(45) Date of Patent: Sep. 20, 2011

(54) METHOD AND APPARATUS FOR RECEIVING DIGITAL VIDEO SIGNALS

(75) Inventors: Ilya Klebanov, Vaughan (CA); Edward G. Callway, Toronto (CA); Chun Wang, North York (CA); Ivan W. Y. Yang, Markham (CA)

(73) Assignee: ATI Technologies ULC, Markham, Ontario (CA)

( * ) Notice: Subject to any disclaimer, the term of this patent is extended or adjusted under 35 U.S.C. 154(b) by 0 days.

(21) Appl. No.: 09/398,913

(22) Filed: Sep. 14, 1999

(51) Int. Cl.
 *H04N 7/16* (2011.01)
(52) U.S. Cl. ......................................... 725/136; 345/531
(58) Field of Classification Search .................. 348/511, 348/556, 558, 448, 714, 716, 718, 561, 423.1, 348/375, 460, 461, 471–474; 345/545, 555, 345/554, 556, 547, 788, 799, 519–520; 725/151, 725/134, 142, 131, 139
See application file for complete search history.

(56) References Cited

U.S. PATENT DOCUMENTS

| | | | | |
|---|---|---|---|---|
| 5,132,793 A * | 7/1992 | Hirahata et al. | ............... | 348/445 |
| 5,461,427 A * | 10/1995 | Duffield et al. | ............... | 348/555 |
| 5,519,446 A * | 5/1996 | Lee | ............... | 348/402.1 |
| 5,534,940 A * | 7/1996 | Sato et al. | ............... | 348/556 |
| 5,635,985 A * | 6/1997 | Boyce et al. | ............... | 348/556 |
| 5,668,599 A * | 9/1997 | Cheney et al. | ............... | 375/240.15 |
| 5,717,461 A * | 2/1998 | Hoogenboom | ............... | 375/240.25 |
| 5,828,418 A * | 10/1998 | Lee | ............... | 348/556 |
| 5,832,085 A * | 11/1998 | Inoue et al. | ............... | 386/124 |
| 5,835,082 A * | 11/1998 | Perego | ............... | 345/555 |
| 5,838,383 A * | 11/1998 | Chimoto et al. | ............... | 348/553 |
| 5,850,266 A * | 12/1998 | Gimby | ............... | 348/465 |
| 5,898,441 A * | 4/1999 | Flurry | ............... | 345/546 |
| 5,898,695 A * | 4/1999 | Fujii et al. | ............... | 370/464 |
| 5,900,867 A * | 5/1999 | Schindler et al. | ............... | 345/719 |
| 5,909,559 A * | 6/1999 | So | ............... | 710/307 |
| 5,912,676 A * | 6/1999 | Malladi et al. | ............... | 348/718 |
| 5,926,228 A * | 7/1999 | Jeon et al. | ............... | 348/554 |
| 5,943,064 A * | 8/1999 | Hong | ............... | 345/546 |
| 5,949,441 A * | 9/1999 | Ristau | ............... | 345/533 |
| 5,982,363 A * | 11/1999 | Naiff | ............... | 715/721 |
| 6,088,047 A * | 7/2000 | Bose et al. | ............... | 345/531 |
| 6,108,042 A * | 8/2000 | Adams et al. | ............... | 348/460 |

(Continued)

OTHER PUBLICATIONS

Acronyms and Glossary Digital Compressed Video Communications and Stroage, Kristine N. Kneib, 1997, 1998, KNK Seminars & Strategies, p. 54 (Transport Stream definition).*

(Continued)

*Primary Examiner* — William Trost, IV
*Assistant Examiner* — Oschta Montoya
(74) *Attorney, Agent, or Firm* — Vedder Price P.C.

(57) ABSTRACT

A method and apparatus for storing a compressed video stream or an uncompressed video stream is disclosed. The uncompressed video stream may be ZOOM VIDEO data. The compressed video stream may be a TRANSPORT STREAM data from a High Definition Television (HDTV) broadcast. A video graphics adapter is configured to properly receive one of the two types of video data. The received data and control signals are monitored to provide a second set of control of data signal which are used by a packer and an window control to provide data of a predetermined width and control to an address generator. The data is buffered within a graphics memory such as a frame buffer. The graphics memory can be written to system memory when full, or accessed by the system memory controller during the fill operation if a multi-ported memory is used.

23 Claims, 8 Drawing Sheets

U.S. PATENT DOCUMENTS

| | | | | |
|---|---|---|---|---|
| 6,108,044 | A * | 8/2000 | Shin | 348/555 |
| 6,118,498 | A * | 9/2000 | Reitmeier | 348/725 |
| 6,144,412 | A * | 11/2000 | Hirano et al. | 348/441 |
| 6,170,049 | B1 * | 1/2001 | So | 712/35 |
| 6,181,822 | B1 * | 1/2001 | Miller et al. | 382/232 |
| RE37,057 | E * | 2/2001 | Lee | 348/443 |
| 6,211,918 | B1 * | 4/2001 | Uwabata et al. | 348/458 |
| 6,275,267 | B1 * | 8/2001 | Kobayashi | 348/555 |
| 6,285,408 | B1 * | 9/2001 | Choi et al. | 348/555 |
| 6,295,090 | B1 * | 9/2001 | Voltz et al. | 348/441 |
| 6,333,938 | B1 * | 12/2001 | Baker | 370/503 |
| 6,369,855 | B1 * | 4/2002 | Chauvel et al. | 348/423.1 |
| 6,418,169 | B1 * | 7/2002 | Datari | 375/240.28 |
| 6,519,283 | B1 * | 2/2003 | Cheney et al. | 375/240.01 |
| 6,526,583 | B1 * | 2/2003 | Auld et al. | 725/139 |
| 2003/0170003 | A1 * | 9/2003 | Levesque et al. | 386/68 |

OTHER PUBLICATIONS

Microsoft Computer Dictionary, 2002, Microsoft Press, Fifth Edition, p. 586.*

Newton, Harry, Newton's Telecom Dictionary, Feb. 2002, CMP Books, 18th Edition, p. 546.*

* cited by examiner

| ADDR | DATA(0:N) | V |
|---|---|---|
| 00 | LINE 0 | |
| 01 | LINE 1 | |
| 02 | LINE 2 | |
| 03 | LINE 3 | |
| 04 | LINE 4 | |
| . . . | | |
| FE | LINE 254 | |
| FF | LINE 255 | |

FIG. 10

METHOD AND APPARATUS FOR RECEIVING DIGITAL VIDEO SIGNALS

FIELD OF THE INVENTION

The present invention generally relates to a video capture system and its methods, and more particularly relates to capturing compressed and uncompressed digital video data.

BACKGROUND OF THE INVENTION

Digital Video Broadcast (DVB) transmission standards have been developed in order to support the emergence of digital television. As illustrated in prior art FIG. 1, the DVB signal is sent via an analog carrier and received by a tuner. The tuner receives the transmitted analog signal and provides an analog representation of the signal to a demodulator portion. The demodulator portion converts the analog signal into its digital format. The digital signal provided by the demodulator is in a compressed MPEG 2 format. The compressed MPEG 2 format is referred to as a transport stream. The transport stream from the demodulator comprises a plurality of packets. Each of the transport stream packets comprises one synchronization byte, followed by one of 187 data bytes or 187 data bytes plus 16 extra bytes depending on the format. The resulting transmission stream packets have a total byte size of one of 188 bytes, or 204 bytes.

The data contained within each packet of the transmission stream can represent video data, audio data, system data, and other user data such as programming information. In other words, more than just video data is provided within the transmission stream. For example, user guides indicating channel selection information or stock market information could be included within a transmission stream packet. Because the transport stream data is contained in a compressed format, when video is being transmitted, there is not a one-to-one correspondence between the actual bytes being transmitted in the transport stream and the pixels which the data represents. Because the data is compressed, one packet of transmission stream data can represent varying numbers of pixels in a video system.

A transport demultiplexor receives the digital transport stream as illustrated in prior art FIG. 1. The transport demultiplexor is capable of routing the individual components represented within the transport stream to the respective clients. In other words, audio data could be provided to an audio client while video data would be provided to a video client. For example, the transport demultiplexor can route data by providing address information to the PCI bridge of FIG. 1.

Also illustrated in the prior art of FIG. 1 is a Peripheral Component Interconnect (PCI) bus supporting conventional computer-type peripherals. Connected to the PCI bus of FIG. 1 are a memory, a Central Processor Unit (CPU), and a video adapter. In order to support the reception and subsequent transmission of the transport stream to one of the system components, such as to the memory or the video adapter, a converter/PCI bridge has been used. The converter portion is necessary in order to change the transport stream into data packets capable of being transmitted across a system bus, such as through the PCI bridge. Such a conversion would require converting the 188-byte packet of the transport stream into 32-bit or 64-bit wide words of information and transporting the words to memory or the video adapter across the PCI bus.

In order to provide data to the video adapter of the prior art, it is necessary for separate printed circuit boards to be used to implement the transport stream converter and video adapter. Separate boards allow a PCI interface to the video memory associated with the video adapter. Separate board increase overall system costs. In addition to increasing overall system costs, the data stream requires approximately 5 Mbytes of PCI bandwidth, thereby limiting the bandwidth available to other system resources. In addition, when analog video is received and digitized (not illustrated), by the prior art system the PCI band data bandwidth is approximately 25 Mbytes.

Another proposed method for receiving DVB data was to use the side port of a video graphics adapter in order to receive the transport stream information. However, the video side port is designed to only receive uncompressed digital video instead of compressed MPEG transport stream. A format conversion chip is needed between the DVB demodulator output and video side port to convert a transport stream into a compatible ITU-656 ancillary stream (digital video or data format) like format. This will add cost to system implementation. Another problem is that the data in the transport stream is not fully compliant with ITU-656 data. (Values such as 00 and FF are not allowed in an ITU-656 stream but allowed in a transport stream. So this implementation cannot work if the video side port is strictly designed for ITU-656 data streams.)

Therefore, a method and apparatus, which overcome the problems of the prior art, would be advantageous.

BRIEF DESCRIPTION OF THE DRAWINGS

FIG. 10 illustrates, in block form, a memory associated with FIG. 5; and

DETAILED DESCRIPTION OF THE DRAWINGS

A method and apparatus for receiving one of a compressed video stream and an uncompressed video stream is disclosed. The uncompressed video stream may be ZOOM VIDEO data or a digitized analog video signal. The compressed video stream may be an MPEG TRANSPORT STREAM data from a High Definition Television (HDTV) broadcast. A video graphics adapter is configured to properly receive one of the two types of video data. The received data and control signals are monitored to provide a second set of control signals that are used by a packer, a window controller, and an address generator. The packer packs data into a format which is compatible with the frame buffer memory. The window controller controls the amount of data written into frame buffer memory. The address generator generates proper frame buffer addresses for the data. The data is stored within a pre-defined area of graphics memory such as a frame buffer. The data can be transferred to system memory when a buffer is full.

Figure 1:
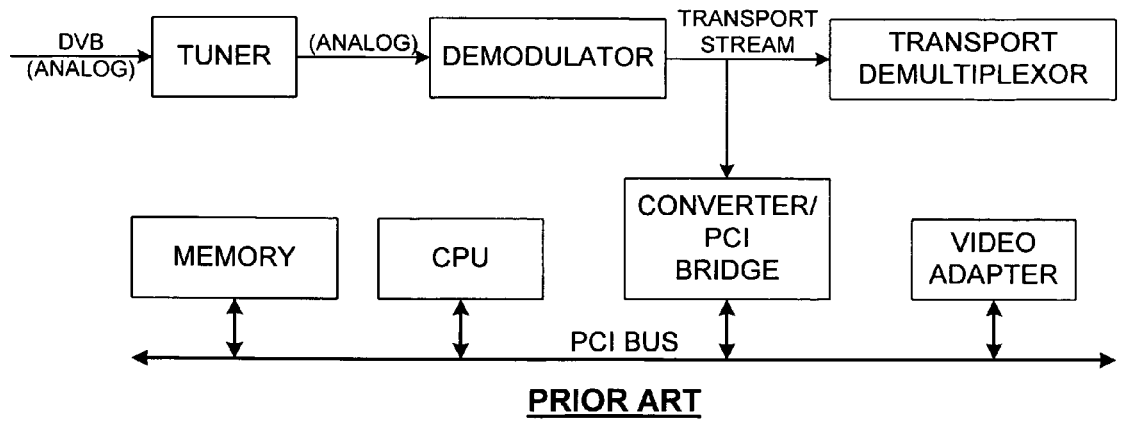
FIG. 1 illustrates, in block diagram form, a prior art system for receiving a transport stream.
Figure 2:
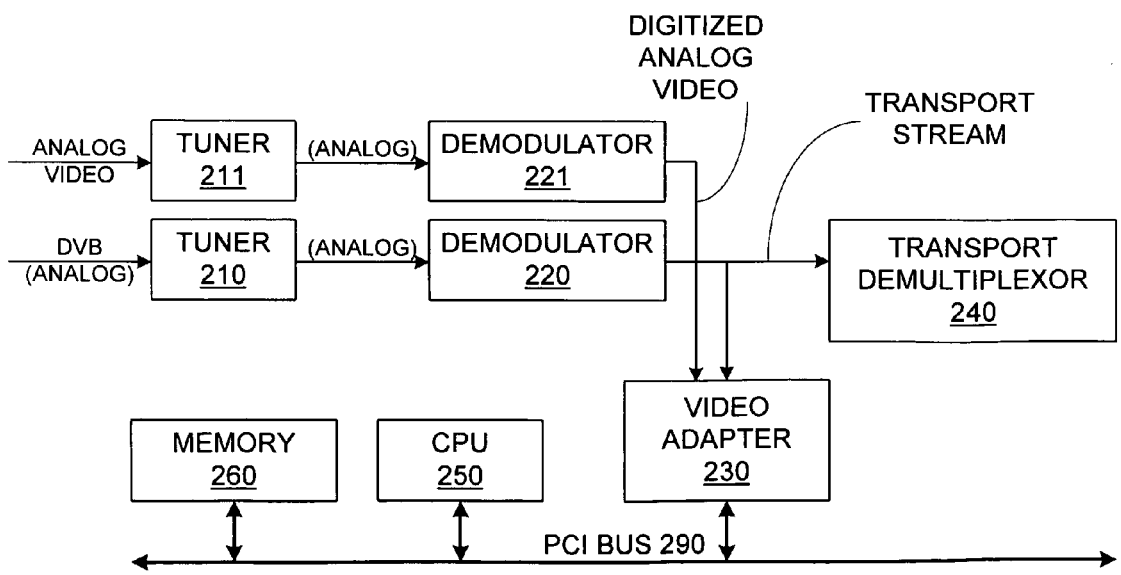
FIG. 2 illustrates, in block diagram form, a system in accordance with the present invention.

FIG. 2 illustrates a system in accordance with the present invention. A digital video broadcast (DVB) signal is received by the tuner 210. The tuner 210 provides a representation of the received analog signal to the demodulator 220. The demodulator 220 demodulates the signal to provide a digital TRANSPORT STREAM to one or both of the transport demultiplexor 240 and the video adapter 230. In accordance with the present invention, the video adapter 230 receives the TRANSPORT STREAM and buffers it into a video memory, or frame buffer. Upon filling the frame buffer, the TRANSPORT STREAM data is either further utilized by the video adapter 230, or at least partially provided to system components, such as the Central Processing Unit (CPU) 250, or the memory 260. A second data path receives an analog signal, such as would normally be associated with television broadcasts, at tuner 211. The signal from tuner 211 is provided to a NTSC/PAL/SECAM demodulator 221 to provide a digital representation of the received analog signal. Note that the tuner 211 and demodulator 221 may be the same, or different, from the tuner 210 and demodulator 220.

Figure 3:
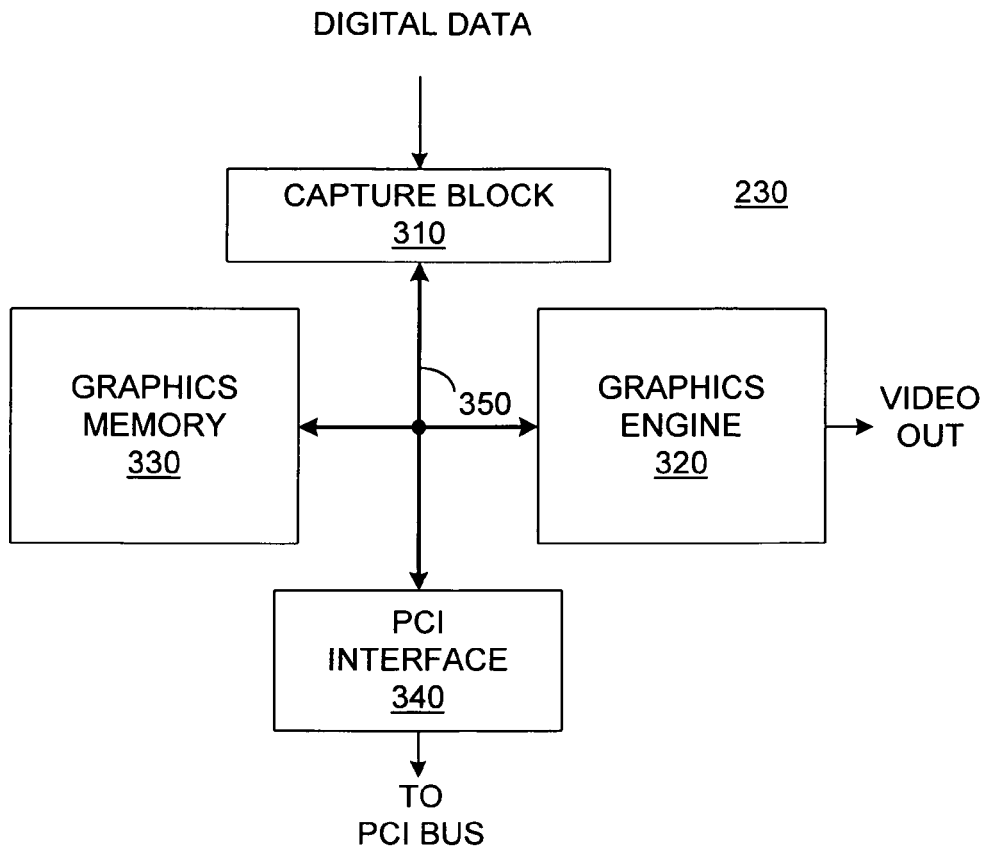
FIG. 3 illustrates, in block diagram form, a detailed view of a portion of FIG. 2.

FIG. 3 illustrates the video adapter 230 in greater detail. In normal operation, the video adapter 230 processes video and/or graphics information and provides a signal labeled VIDEO OUT. The VIDEO OUT signal is used to drive an image onto an external display device (not shown). In accordance with the present invention, the video adapter 230 includes a capture block 310 to receive a data stream, a graphics engine 320, a graphics memory 330, and a PCI interface 340.

In operation, the digital data stream, such as the TRANSPORT STREAM from the demodulator 220 of FIG. 2, is received at the capture block 310. Where the digital data stream is a TRANSPORT STREAM, the TRANSPORT STREAM comprises both data and control information. Generally, the TRANSPORT STREAM includes a plurality of packets. Each packet of TRANSPORT STREAM information includes a synchronization byte followed by a predetermined number of data bytes. The data bytes can include routing information stored as header information, or as raw data as identified by the header information. When the data is transmitted as header information, it is in an uncompressed form that indicates the type of data that is to follow the header. A single header can be included in one or more packets.

The capture block 310 receives the TRANSPORT STREAM information and provides the necessary data and control in order to store the compressed TRANSPORT STREAM data within the graphics memory 330. The memory 330 is accessed over the bus 350. In a specific embodiment, the memory 330 is a frame buffer used by the graphics engine 320. The memory 330 is connected to the capture block 310 through the bus 350 which accommodates the necessary data, address, and control lines for accessing memory 330. The graphics memory 330 is also connected to the graphics engine 320 and the PCI Interface 340 through the bus 350.

In accordance with the present invention, the graphics memory 330 can operate as a frame buffer for the graphics engine 320, or as a buffer to store the TRANSPORT STREAM data. The PCI Interface 340 provides an interface between the internal bus 350 to an external PCI bus. Generally, the PCI Bus will be a system bus. It should be noted that while a PCI interface 340 has been shown, the present invention anticipates the use of other type bus interfaces. Therefore, the PCI interface 340 may be any bus type whether an industry standard or a proprietary interface.

Figure 4:
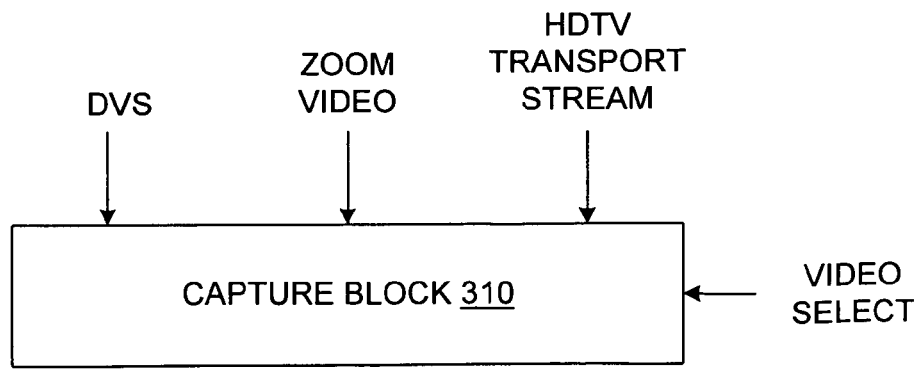
FIGS. 4 and 5 illustrate, in block diagram form, a detailed view of a portion of FIG. 3.

FIG. 4 illustrates the capture block 310 in greater detail. Specifically, the capture block 310 is shown to receive a number of different types of video data. As indicated, 8-bit DVS ((Digital Video Stream) video and ZOOM VIDEO is received. Generally, the 8-bit DVS and ZOOM VIDEO data are ITU-601 or ITU-656 related digital video streams. These streams are not compressed video streams. However, the HDTV TRANSPORT STREAM received by the capture block 310 of FIG. 4, as previously mentioned, is a compressed video stream, such as MPEG 2. While the DVS, ZOOM VIDEO and TRANSPORT STREAM are illustrated in FIG. 4 separately, in operation, the signals will share inputs that can be multiplexed, or de-multiplexed as needed. For example, the data bits from each format can be received by a common set of pins A signal labeled VIDEO SELECT is used to indicate to the Capture Block 310, which type of video is to be received. By allowing for one of a plurality of types of digital video data to be received, greater flexibility is realized within the Video Graphics Adapter (VGA). This reuse of common circuitry allows for an efficient implementation of the present invention. Yet another advantage of the system as illustrated in FIG. 3 is that it reduces system costs over the prior art in that the PCI interface 340 already residing within the VGA is used to store transport buffered stream data.

Figure 5:
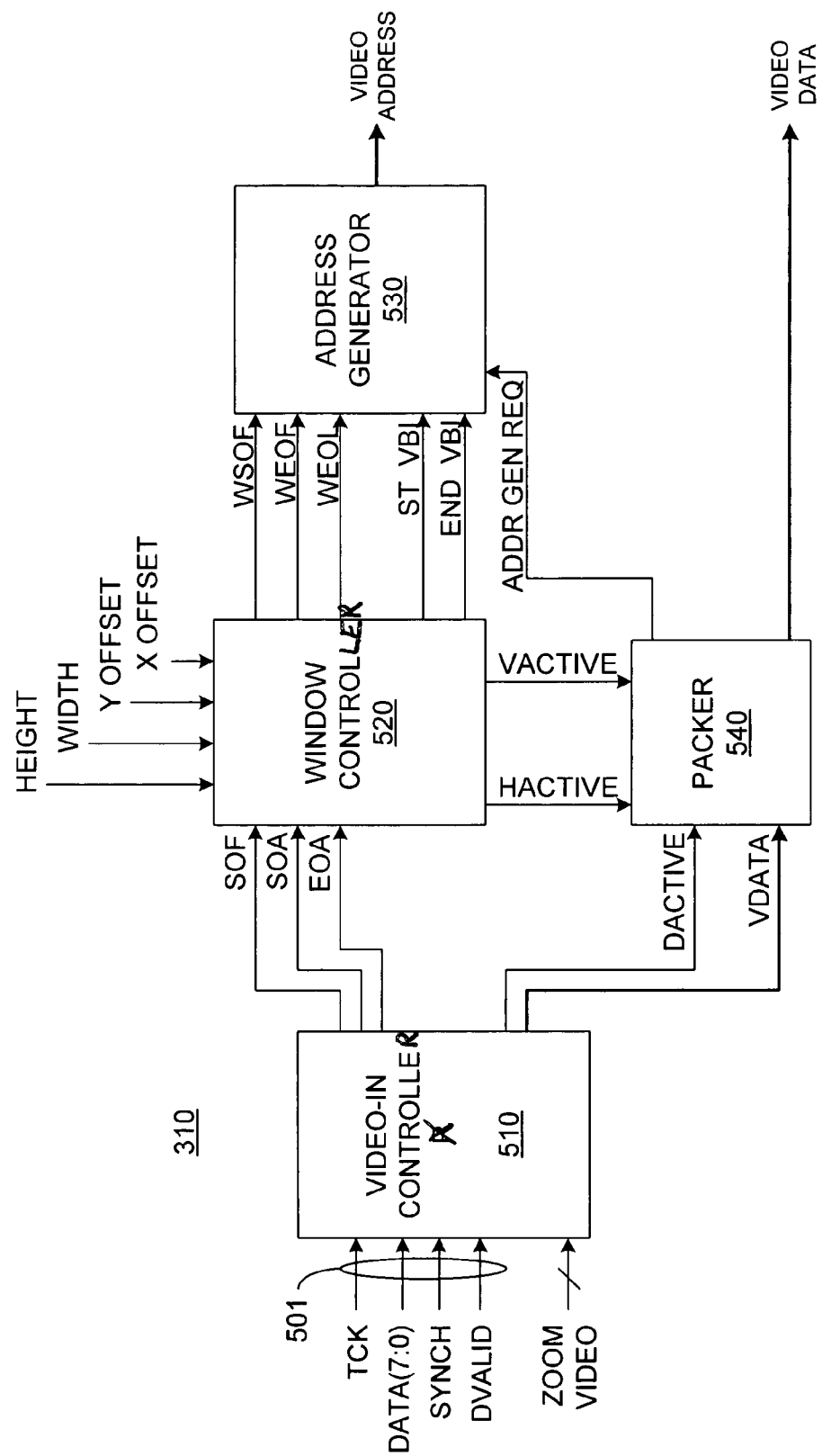

FIG. 5 illustrates the capture block 310 in greater detail. FIG. 5 will be discussed with reference to FIGS. 6-10, which illustrate specific embodiments of the present invention including various timing diagrams.

In FIG. 5, the TRANSPORT STREAM, and any other type of digital video, such as ZOOM VIDEO, is received by the video-in controller 510 of FIG. 5. The TRANSPORT STREAM includes the signals 501, which include a multi-bit data signal (DATA), a synchronization signal (SYNCH), a data valid signal (DVALID), and a clock signal (TCK). The ZOOM VIDEO data is illustrated as a bus. However, it should be noted, that the signals 501 can be multiplexed and/or de-multiplexed (not shown) to receive either ZOOM VIDEO or TRANSPORT STREAM data.

The video-in controller 510 acts as a stream interface control to convert the received signal, whether ZOOM VIDEO or a TRANSPORT STREAM, into a Start of Field (SOF) signal, a Start of Active (SOA) signal, an End of Active (EOA) signal, a Data Active (DACTIVE) signal, and a Video Data (VDATA) signal. For ZOOM VIDEO, these signals are represented in FIGS. 6 and 7.

Figure 6:
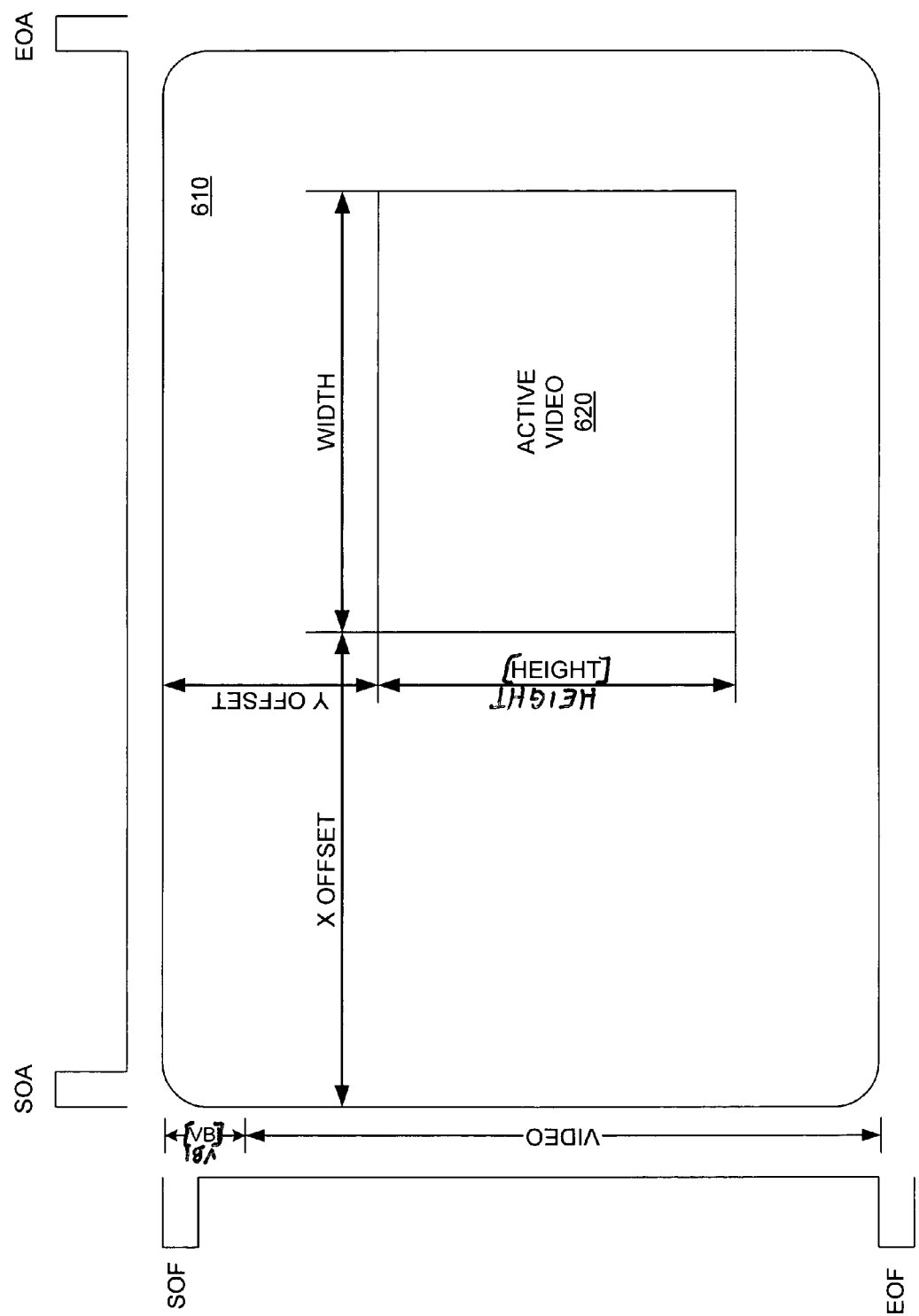
FIG. 6 illustrates an active video area in a video frame.

FIG. 6 represents a frame of video 610. In a specific embodiment, the video is representative of ZOOM VIDEO. The frame of video 610 has a Vertical Blanking Interval (VBI) which resides in the first few lines of video. The VBI information is not displayed, but can be used to provide data for other operations of functions. Following the VBI portion, VIDEO is provided. Within the VIDEO portion, an active video 620 is illustrated which represents a portion of the VIDEO to actually be displayed. At the beginning of each line of the frame 610, a Start of Active (SOA) pulse is provided. At the end of each line of the frame 610, an End of Active (EOA) video signal is provided. At the beginning the first line of the frame 610, the start of a new frame is indicated by a Start of Frame (SOF) indicator. Note that the SOA and EOA refers to the active video relative to the ZOOM VIDEO standard which is the entire VIDEO portion relative to the transmitted data. The active video 620 is the active video relative to the user.

The active video 620 of FIG. 6 indicates the portion of the received VIDEO to be displayed. One example of the active video 620 varying from the received VIDEO is when the received video to be displayed on a standard television is High Definition Television (HDTV), which has a different aspect ratio than standard television. In this mode of operation, it is desirable to select only a portion of the HDTV frame for display on a standard television screen. In order to specify the desired active video 620, it is necessary to specify a Y OFFSET indicated where the first line of active video 620 begins, a X OFFSET indicating which pixel is the first pixel of active video 620, a WIDTH indicating the number of pixels in a containing active video 620, and a HEIGHT indicating the number of lines containing the active video. Note that the X OFFSET, and Y OFFSET are illustrated to be relative to the first line and pixel of the frame 610. However, in other embodiments, other reference locations can be indicated.

Figure 7:
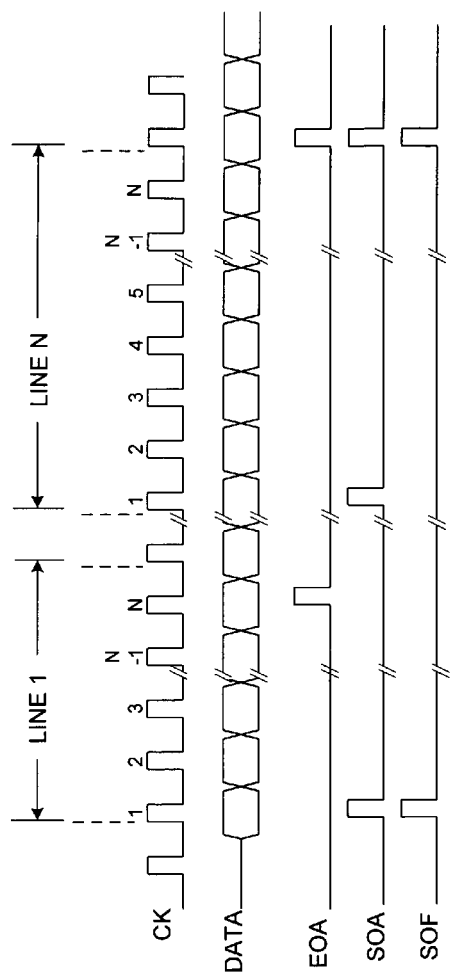
FIGS. 7 and 8 illustrate, in timing diagram form, timing signals associated with one type of digital video.

FIG. 7 illustrates the signals associated with ZOOM VIDEO. The ZOOM VIDEO signals received by the video-in controller 510 are substantially similar to the signals provided by the video-in controller 510, except that no DACTIVE signal is received. Therefore, since there is no equivalent signal to DACTIVE in ZOOM VIDEO, the DACTIVE signal from video-in controller 510 specified is asserted when the video-in controller 510 receives data.

Figure 8:
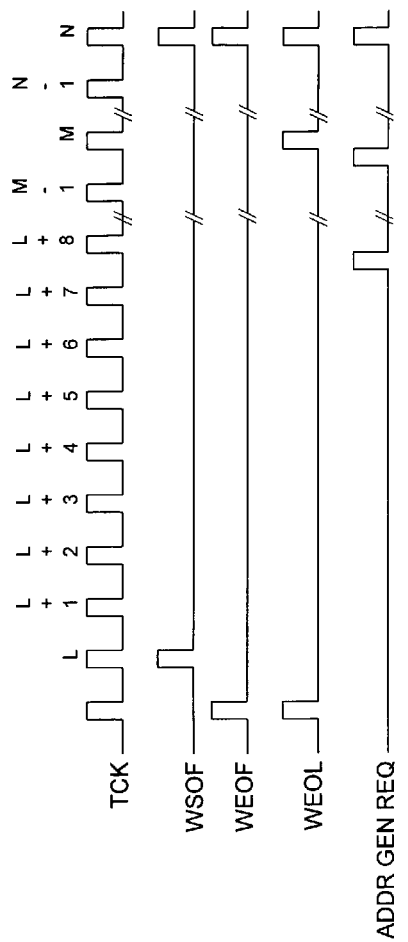

In operation, the window controller 520 receives the SOF, SOA, and EOA signals from the video-in controller 510. In addition, the window controller 560 receives, and/or has access to values indicating the X OFFSET, Y OFFSET, WIDTH, and HEIGHT values associated with FIG. 6. These values can be provided in any number of manners, including inputs to the window controller 520, or by accessing register locations. From the received values and signals, the window controller 520 generates a second set of control signals: Window control Start of Field (WSOF); Window control End of Field (WEOF); Window control End of Line (WEOL); Vertical Active (VACTIVE); and Horizontal Active (HACTIVE). These signals are further described with reference to the table below, and the relationship of the signal WSOF, WEOF, and WEOL are illustrated in FIG. 8.

WINDOW CONTROL OPERATION FOR ZOOM VIDEO

SIGNAL DESCRIPTION
WSOF Pulse active when at first pixel of active video.
WEOF Pulse active at last pixel of active video.
WEOL Pulse active at end of each line of active video.
HACTIVE Asserted when pixel count within WIDTH.
VACTIVE Asserted when line count is with in HEIGHT.

The signal WSOF (Window control Start of Field) provides an asserted pulse when the first pixel of the active video 620 is encountered. The first pixel location can be determined by comparing the X OFFSET and Y OFFSET values to the current pixel and line numbers, which are maintained by the system. For example, in one implementation, the Y OFFSET represents the first line of active video 620, while the X OFFSET represents the first pixel of active video 620 within a line. This is represented in FIG. 8, where the signal WSOF is active at the same time as the clock pulse labeled L. The clock pulse L represents the time at which the first pixel of the active video 620 is available.

The signal WEOF provides an asserted pulse when the last pixel of the active video 620 is encountered. The last pixel location can be determined by comparing the sum of the WIDTH and X OFFSET values to the current pixel number, and comparing the sum of the HEIGHT and the Y OFFSET values to the line number. For example, in one implementation, the X OFFSET plus the WIDTH less one indicates the last bit of active video 620 associated with a line. Likewise, Y OFFSET plus the HEIGHT less one indicates the last line of active video 620. Therefore, by monitoring these values, the WEOF signal can provide an asserted pulse when both the last line and pixel of an active video 620 region is encountered. This is illustrated in FIG. 8, where the signal WEOF is active at a time in conjunction with the clock pulse labeled N. The clock pulse N represents the time at which the last pixel of the active video 620 is available.

The signal WEOL provides an asserted pulse when the last pixel of a line of active video 620 is encountered. The last pixel of a line can be determined by comparing the sum of the WIDTH and X OFFSET values to the current pixel number. For example, in one implementation, the X OFFSET plus the WIDTH minus one represents the last bit of a line of active video 620. This number can be compared to the current pixel number to determine whether the end of line has occurred. WEOL is represented in FIG. 8, where the signal WEOL is active at a time in conjunction with the clock pulses labeled M and N. The clock pulses M and N represents the time at which the last pixel of a line of data is available.

The signal HACTIVE is asserted when the current pixel location is within the WIDTH region. Note that a pixel does not have to be in the active video 620 in order for HACTIVE to be asserted. This allows for an embodiment whereby only the pixel number is monitored and compared to the values associated with the WIDTH of the active video 620. Likewise, the VACTIVE signal is asserted when the current line number is within the HEIGHT region indicated in FIG. 6.

It will be understood by one skilled in the art, that the exact time at which the window controller 520 provides a given control signal can vary depending upon specific embodiments. For example, the WEOL signal can be asserted in conjunction with the last pixel, or after the last pixel.

Referring to FIG. 5, the signals generated by the window controller 520 are used by the packer 540 and the address generator 530 to provide data and addresses to the buffer. In one embodiment, the packer 640 receives 8-bit bytes of data, and combines them to form larger data words labeled VIDEO DATA. For example, the VIDEO DATA signal can comprise 32, 64, or 128 bit words of video data. The width of VIDEO DATA can be fixed or programmable. The DACTIVE, HACTIVE, and VACTIVE signals qualify the VDATA received by the packer 540.

For ZOOM VIDEO, DACTIVE is always asserted. Therefore, the packer 540 uses the HACTIVE and VACTIVE data to qualify VDATA. For example, when both HACTIVE and VACTIVE are asserted, the data value received on VDATA is within the active video 620, and will be included by the packer 540 within the VIDEO DATA. If either of HACTIVE and VACTIVE are inactive, the data value received on VDATA is not within the active video, and will not be included by the packer 540 as part of the VIDEO DATA.

The described embodiment for receiving ZOOM VIDEO provides for an efficient means to receive only a desired portion of VIDEO DATA, however, the data received needs be readily associated with a specific line and a pixel in order to determine where the active video resides. In contrast, DVB data is compressed, and visibility as to the line and pixel locations not readily available without decompression of the data first occurring. In specific embodiments, it is desirable to perform such decompression of the data first occurring. In specific embodiments, it is desirable to perform such decompression by other parts of the system, or at least to store the compressed data in other parts of the system. Therefore, one embodiment of the present invention further allows compressed data, such as DVB TRANSPORT STEAM data, to be buffered within the graphics memory 330 of FIG. 3.

Figure 9:
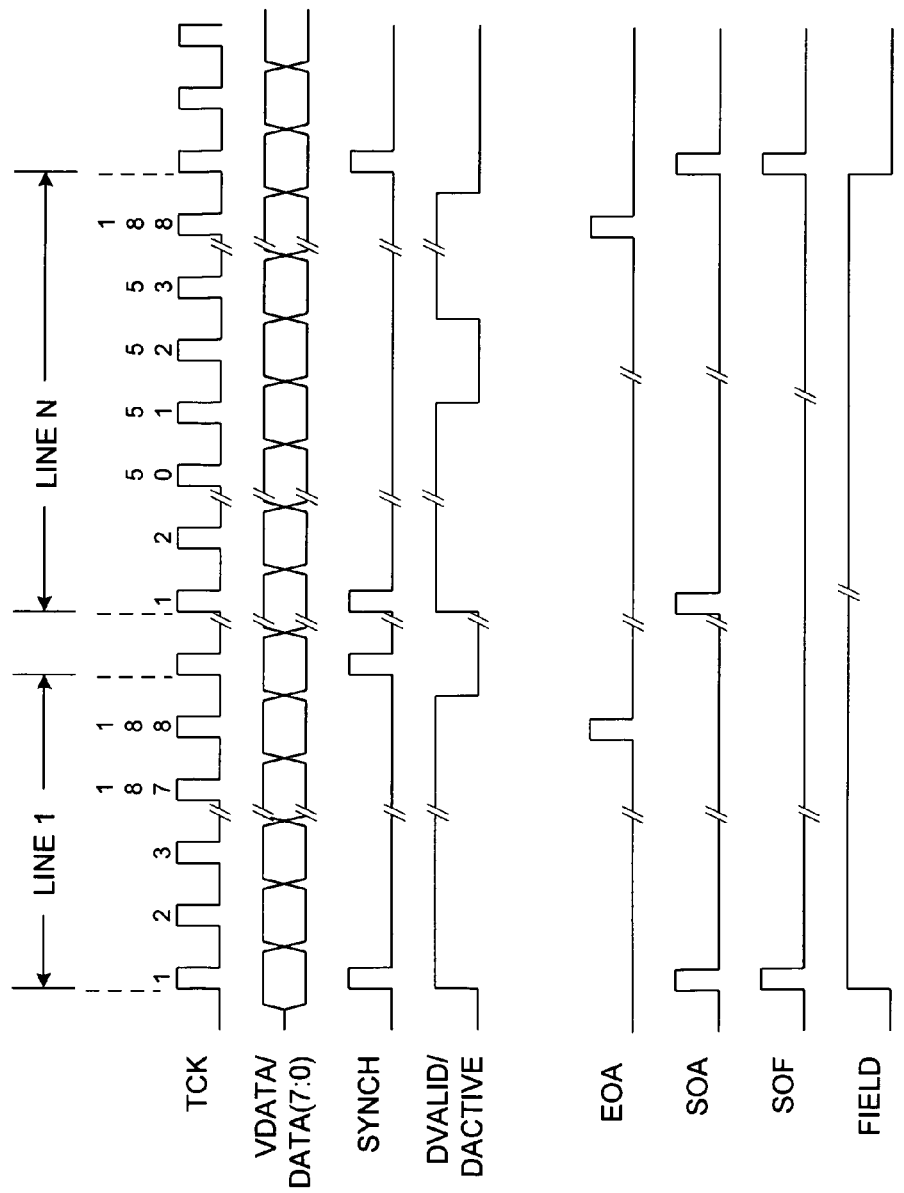
FIG. 9 illustrates, in timing diagram form, timing signal associated with a transport stream.

FIG. 9 illustrates a timing diagram representing signals associated with the TRANSPORT STREAM of FIG. 2. The TRANSPORT STREAM includes a signal labeled TCK, which provides one clock pulse to qualify each byte of data.

A synchronization (SYNCH) signal indicates the beginning of a new line or packet of information. In addition, a data valid signal (DVALID) indicates when the packet data being transmitted is valid.

In response to the TRANSPORT STREAM, the video-in controller 520 drives the signals SOF, SOA, EOA, DACTIVE and VDATA. The manner in which these signals are generated is different for a TRANSPORT STREAM than for the ZOOM VIDEO previously discussed. The table below indicates the operation of the window controller 520 for TRANSPORT STREAM reception.

OPERATION FOR RECEPTION OF A
TRANSPORT STREAM

VIDEO-IN
SIGNAL DESCRIPTION
SOF Pulse active to indicate the first byte of a TRANSPORT STREAM packet to be stored in buffer.
SOA Pulse active to indicate the first byte of a TRANSPORT STREAM packet.
EOA Pulse active to indicate the last byte of a TRANSPORT STREAM packet.
DACTIVE Asserted to indicate invalid bytes as indicated by DVALID.
VDATA Data from TRANSPORT STREAM.

During reception of the TRANSPORT STREAM, the SOF signal provides an asserted pulse to indicate that the first byte to be stored in the graphics memory 330 is present. In one embodiment, the video-in controller 510 will use a counter to keep track of the number of lines and bytes of compressed data provided to the window controller 520. When the number of lines sent to the window controller 520 exceeds the number of lines available in the graphics memory 330, the SOF is pulsed again to indicate a new first byte to be stored in the graphics memory. The SOF signal of FIG. 9 illustrates two pulses. The first pulse corresponds to TCK 1, which is associated with the first data byte to be stored in the graphics memory 330. The second SOF pulse occurs on the first TCK after line N has been transmitted, where N is the total number of lines to be stored in the graphics memory 330. Note that in FIG. 9, the number of bytes in a line of video memory is 138. Coincidentally, this is the same number of bytes that are in a TRANSPORT STREAM packet. In other embodiments, the line size is different than the packet size, such that a line of video memory will not necessarily contain an integer number of packets.

Note that the graphics memory 330 can have one or more buffer locations. Where multiple buffer locations are present, it is possible to switch between buffers when one buffer is full, and continue storing data without delay, or with minimal delay, in a second buffer. If only one frame buffer is available, and it becomes full, it will be necessary to write at least some of the graphics memory 330 contents to system memory, or lose data by writing over the stored values. By using a dual ported graphics memory 330, it would be possible to buffer data and transmit it to the system simultaneously. In another embodiment, a single ported memory can also do the job, by interleaving between read and write operations.

The video-in controller 510 signal SOA indicates that the first byte of a TRANSPORT STREAM packet is being transported. The SOA signal can be qualified by the TRANSPORT STREAM's SYNCH signal. There are three such SOA pulsed indicated in FIG. 9.

The EOA signal indicates that the last byte of a TRANSPORT STREAM packet is being transmitted, or has been transmitted. In one embodiment, the generation of the EOA signal is determined by utilizing a counter, state machine, or ALU to determine when the predetermined number of bytes have been transmitted. Because the signal can be corrupted, there may not be the predetermined number of clock signals before the next SYNCH pulse occurs. Therefore, in another embodiment, a clock independent of the TCK can be used to determine when to assert the EOA signal. Such a clock can be phase locked to the SYNCH signal to maintain an accurate indication of when EOA is to occur.

The signal DACTIVE indicates when the data presented to the packer 540 is valid. As indicated in FIG. 9, the signal DACTIVE will generally mirror the signal DVALID of the TRANSPORT STREAM.

The signal VDATA will generally be the TRANSPORT STREAM data bytes (DATA(7:0)).

The window controller 520 receives the SOF, SOA, and EOA signals from the video-in controller 510 representing the TRANSPORT STREAM. In addition, the window controller 520 receives, and/or has access to, values indicating the X OFFSET, Y OFFSET, WIDTH, and HEIGHT values associated with FIG. 6. For TRANSPORT STREAM reception, the X OFFSET and Y OFFSET will generally be zero, the WIDTH will be number of bytes in the TRANSPORT STREAM, and the HEIGHT will indicate the number of lines to be stored in the graphics memory 330. From the received values and signals, the window controller 520 generates the signals: Window control Start of Field (WSOF); Window control End of Field (WEOF); Window control End of Line (WEOL); Vertical Active (VACTIVE); and Horizontal Active (HACTIVE). These signals are further described with reference to the table below.

WINDOW CONTROL OPERATION FOR
TRANSPORT STREAM DATA

SIGNAL DESCRIPTION
WSOF Pulse qualified to SYNCH signal and counter.
WEOL Pulse qualified to EOA.
WEOF Pulse qualified to SOF and EOA.
HACTIVE Assertion qualified to SOA and EOA when pixel count within WIDTH.
VACTIVE Asserted when between SOA pulse and EOA pulse
HACTIVE Asserted when between SOF pulse and WEOF.

The signal WEOL provides an asserted pulse when the last byte of a TRANSPORT STREAM packet is encountered. Generally, WEOL signal will be based on the BOA signal.

The signal WSOF signal provides an asserted pulse to indicate the first byte to be stored within a buffer of the graphics memory 330 buffer. For a specific embodiment, where the video-in controller 510 monitors and maintains the number of lines being written, the WSOF signal for a TRANSPORT STREAM will be analogous to the SOF signal generated by the video-in controller 510.

The signal WEOF signal provides an asserted pulse to indicate the last byte to be stored in the current buffer location of the graphics memory 330. The window controller 520 generates the WEOF signal by comparing the number of EOA signal received since SOF was active, and comparing this number to the provided HEIGHT value. By setting the Y OFFSET to zero, and the HEIGHT value to the number of lines in the graphics memory 330, it is possible for the window controller 520 to generate the correct WEOF pulse without additional hardware.

The signal HACTIVE is asserted when the current byte location is within the WIDTH region which is set to the number of bytes in a packet (188 bytes).

The signal VACTIVE is asserted when the current data being received is to be stored in the current line of the buffer.

The Packer 640 provides a signal labeled ADDR GEN REQ, which indicates when a line of data is ready to be stored in the Graphics Memory 330. The Graphics Memory 330 address and control information, is provided to the Graphics Memory 330 by the Address Generator 530 when ADDR GEN REQ is active.

With TRANSPORT STREAM data, it is possible for invalid data to be received. In order to provide visibility to other system portions as to when the stored TRANSPORT STREAM data is valid, a VALID byte location can be included as part of the buffer. FIG. 10 illustrates one such VALID byte. By storing a unique value in this byte location, subsequent systems can be notified of the invalid data. In another embodiment, specific values can be stored to indicate those times when invalid data is received. In yet another embodiment, the entire line could be flushed, thereby only permitting valid lines of data to be stored. For types of uncompressed video where the valid byte is not needed, normal video data can be stored at the VALID location.

An error signal can also be incorporated into the transport stream. When an error signal is received, a specific code can be generated and written with the data stream. Subsequent systems can be notified that an error occurred by monitoring the data and reacting accordingly.

In this manner, compressed and uncompressed data can be stored in the frame buffer represented by graphics memory 330. Once an entire frame of data is stored in the graphics memory 330 the data can be written to system memory, or it can be decompressed by the graphics engine 320.

By having the video-in controller 510 generate the SOF, SOA, EOA, DACTIVE, and VDATA in the manner indicated, it is possible to use much of the same hardware to implement a storage apparatus for both compressed and uncompressed video.

Figure 11:
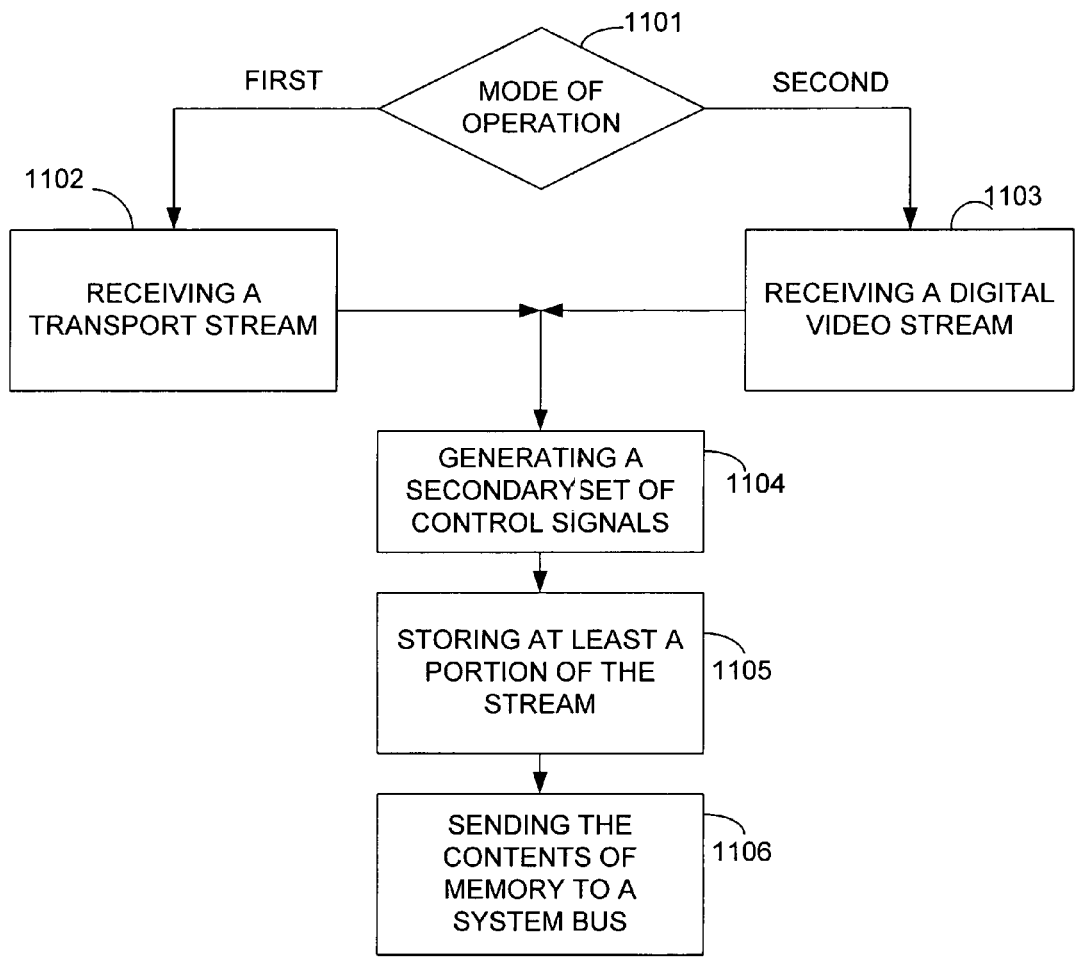
FIG. 11 illustrates, in flow diagram form, a method in accordance with the present invention.

FIG. 11 illustrates a method in accordance with the present invention. Generally, the method of FIG. 11 has been discussed with respect to the specific system herein. At step 1101, a determination is made whether a first or second type of video data is to be received. Specifically, the first type of data represents TRANSPORT STREAM data as indicated in step 1102. The second type of data represents a digital video stream different from a TRANSPORT STREAM, such as the ZOOM VIDEO signal discussed herein, as indicated at step 1103.

At steps 1102 and 1103 the system is configured for either a TRANSPORT STREAM or a different digital video stream, respectively. As discussed with respect to TRANSPORT STREAM and ZOOM VIDEO herein, these configurations indicate how a video controller will generates its output signals.

At step 1104, a secondary set of control signals is generated from the received data stream. This corresponds to the video-in controller 510 generating signals SOF, SOA, EOA, DACTIVE, AND VDATA, as discussed herein.

At step 1105, at least a portion of the data stream is stored. Step 1105 corresponds to the window controller 520, packer 540, and address generator 530 working together as a data storage controller to store words of data in a buffer associated with graphics memory 330. These words of data will contain at least a portion of the data received by the video-in controller 510 in the manner discussed herein.

At step 1106, the information stored in the graphics memory 330 is written to a system bus via the PCI interface of FIG. 3.

The present invention has been described with reference to a specific embodiment. One of ordinary skill in the art will recognize that other embodiments may exist. For example, the data storage described herein has been described with reference to using SOF/EOF/SOA/EOA video fields to store TRANSPORT STREAM data. In a similar manner, fields such as Start of VBI and End of VBI could be used to indicate when to store the transport stream data. Such an implementation would require the window controller 520 to provide indicators when VBI data is active and should be stored. By indicating the VBI data had the same number of lines of the buffer associated with the graphics memory 330, the TRANSPORT STREAM data can be stored.

Another variation would allow the TRANSPORT STREAM data to be stored in the buffer in a compressed form only when it is of a desired type of data. For example, the headers of the TRANSPORT STREAM can be monitored to allow only a specific type of data, such as video or audio, to be buffered.

It should be further understood that specific functions and steps described may actually be implemented in hardware and/or in software. For example, the signal generation performed by the window controller 520 can be performed by a hardware engine, firmware such as in microcode executed on the processing engine or it may even be performed fully in software. In general, such functions can be performed in a processing module that may be a single processing device or a plurality of processing devices. Such a processing device may be a microprocessor, microcontroller, digital signal processor, microcomputer, portion of the central processing unit, state machine, logic circuitry, and/or any device that manipulates signals (e.g., analog or digital) based on operational instructions. The memory may be a single memory device or a plurality of memory devices. Such a memory device may be a read-only memory, random access memory, floppy disk memory, magnetic tape memory, erasable memory, portion of system memory, and/or any device that stores operational instructions in a digital format. Note that when the processing module implements one or more of its functions via a state machine or logic circuitry, the memory storing the corresponding operational instructions is embedded within the circuitry comprising the state machine and/or logic circuitry.

The specific embodiments of the present invention disclosed herein are advantageous in that TRANSPORT STREAM data can be buffered in a portion of memory normally used by the video graphics adapter. Furthermore, the amount of overhead needed to store the TRANSPORT STREAM data is minimal because the system hardware/firmware/software is largely in place to handle the data. This is an advantage over other prior art embodiments which had dedicated hardware to merely convert TRANSPORT STREAM data into a useful format before be received by a VGA controller. By allowing transport stream data to be received directly by the VGA controller, cost savings and efficiencies are gained. In addition, variations of the specific embodiments are anticipated. For example, the uncompressed video may be digitized NTSC/PAL/SECAM signals as well.

We claim:

1. A video graphics system comprising:
a transport stream port to receive a digital video transport stream, the digital video transport stream including a data stream and control signals;
a transport stream interface control having an input coupled to the transport stream port, and having a first output port to provide a set of control signals, and a second output port to provide video graphics data; and a data storage controller having a first input port coupled to the first output port of the transport stream interface control to accept the set of control signals of the transport stream interface control, a second input port coupled to a second output port of a transport stream interface control to accept video graphics data, an output address port to provide an address value, an output video data port to provide video data, and at least one pair of a plurality of internal control ports to communicate control signals within the data storage controller.

2. The system of claim 1 further comprising:
a memory having a first port coupled to the output video data port of the data storage controller and a second port coupled to the address port of the data storage controller.

3. The system of claim 2, wherein the memory is a frame buffer memory.

4. The system of claim 2 further comprising:
a system bus interface having a first port coupled to a third port of the memory, and a second port coupled to a fourth port of the memory.

5. The system of claim 4, wherein the third port of the memory is substantially the same as the second port of the memory.

6. The system of claim 1, wherein the digital video transport stream is a digital video broadcast transport stream.

7. The system of claim 6, wherein the control signals of the digital video transport stream include a clock signal, a synchronization signal, and a data valid signal.

8. The system of claim 7, wherein the set of control signals of the transport stream interface control includes a start of field signal to indicate the start of a frame of video.

9. The system of claim 8, wherein the set of control signals of the transport stream interface control signal includes a valid data output to indicate when data on the second output port of the transport stream interface control is active video data.

10. The system of claim 9, wherein the set of control signals of the data storage controller includes a valid vertical blanking interval signal to indicate when data on the output video data port of the data storage controller is present during a vertical blanking interval.

11. The system of claim 7, wherein the control signals of the digital video transport stream further include an error signal, indicating there is an error in the transport stream.

12. The system of claim 6, further comprising:
a first video port to receive digital video of a first type, wherein the first type is not digital video broadcast stream video;
a first video interface control having an input coupled to the first video port, and having a first output port to provide the set of control signals, and a second output port to provide video graphics data; and
a select node coupled to the transport stream interface control and to the first video interface control.

13. The system of claim 12, wherein the first video port is a zoom video port.

14. The system of claim 12, wherein the first video port is a digital video stream port.

15. The video graphics system of claim 1 comprising:
a packer;
a window control; and
an address generator, wherein the packer is operative to pack data into a format that is compatible with a frame buffer memory, the window controller is operative to control the amount of data written into the frame buffer memory, and the address generator is operative to generate proper frame buffer addresses for data from the transport stream, and wherein the frame buffer addresses comprise addresses corresponding to a predefined area of the frame buffer.

16. A method of receiving video graphics data, the method comprising:
receiving a compressed transport stream associated with a digital video broadcast signal, the compressed transport stream having data signals and control signals;
generating a secondary set of memory control signals from the compressed transport stream's control signals;
storing at least a portion of the compressed transport stream data signals via a first bus in a memory buffer controlled by the secondary set of memory control signals wherein the memory buffer comprises a frame buffer that stores uncompressed data in a different mode of operation; and
sending at least the portion of the compressed transport stream data stored in the memory buffer via the first bus to a system bus.

17. The method of claim 16, further comprising:
wherein the receiving, generating and storing occur when in a first mode of operation;
during a second mode of operation, performing:
receiving a digital video signal having data signals and control signals, wherein the digital video signal is of a different type than the compressed transport stream;
generating the secondary set of control signals from the digital video signal's control signals; and
storing at least a portion of the digital video signal in the memory buffer based on the secondary set of control signals.

18. The method of claim 17, wherein the video signal is a zoom video signal.

19. The method of claim 16 wherein the secondary set of control signals from the compressed transport stream indicate at least: that a first byte of a transport stream packet is to be stored in the frame buffer, a first byte of the transport stream packet and a last byte of the transport stream packet.

20. A system for receiving a digital video broadcast signal, the system comprising:
a tuner to receive a digital video broadcast signal and to provide an analog output signal;
a demodulator coupled to receive the analog output signal from the tuner, and to provide a compressed transport stream;
a video graphics adapter having a transport stream port to receive the compressed transport stream and another transport stream, the video graphics adapter further includes a bus interface port coupleable to a central processing unit, and further includes a graphics engine and a video output port;
wherein the video graphics adapter is operative to store at least a portion of compressed transport stream data signals to be at first in frame buffer memory controlled by a secondary set of memory control signals derived from the compressed transport streams control signals, and storing uncompressed data in the frame buffer memory in a different mode of operation.

21. The system of claim 20, wherein the video graphics adapter includes:
memory operably coupled to the graphics engine, the transport stream port and to the bus interface port to store at least a portion of the compressed transport stream and coupled to store data for the graphics engine wherein the memory comprises frame buffer memory.

22. The system of claim 20, further comprising:
- a central processor unit coupled to the bus interface port of the video graphics adapter; and
- a transport demultiplexor coupled to a demodulator.

23. A method of receiving video graphics data, the method comprising:
- receiving a compressed transport stream associated with a digital video broadcast signal, the compressed transport stream having data signals and control signals;
- generating a secondary set of control signals from the compressed transport stream's control signals;
- storing at least a portion of the compressed transport stream data signals via a first bus in a memory buffer controlled by the secondary set of control signals wherein the memory buffer comprises a frame buffer that stores uncompressed data in a different mode of operation;
- sending the at least portion of the compressed transport stream data stored in the memory buffer via the first bus to a system bus;
- wherein generating the secondary set of control signals comprises generating frame based control signals to store the compressed transport stream data in the frame buffer wherein transport stream packets containing compressed data are stored in the frame buffer memory based on display frame control signals; and
- wherein the secondary control signals include a start of frame control signal indicating that a first byte of transport stream packet is to be stored in the frame buffer, a start of active frame control signal indicating the first byte of transport stream packet, and end of active frame control signal indicating the last byte of a transport stream packet and a deactive control signal that is asserted to indicate invalid bytes are present in the compressed transport stream.

* * * * *